(12) United States Patent
Lando

(10) Patent No.: US 9,678,358 B2
(45) Date of Patent: Jun. 13, 2017

(54) FLOATABLE EYEWEAR

(71) Applicant: Clic Goggles, Inc., Corte Madera, CA (US)

(72) Inventor: Ron Lando, Corte Madera, CA (US)

(73) Assignee: Clic Goggles, Inc., Corte Medera, CA (US)

( * ) Notice: Subject to any disclaimer, the term of this patent is extended or adjusted under 35 U.S.C. 154(b) by 193 days.

(21) Appl. No.: 14/726,575

(22) Filed: May 31, 2015

(65) Prior Publication Data

US 2016/0349534 A1    Dec. 1, 2016

(51) Int. Cl.
| | |
|---|---|
| G02C 5/02 | (2006.01) |
| G02C 3/00 | (2006.01) |
| G02C 5/20 | (2006.01) |
| G02C 5/22 | (2006.01) |
| G02C 5/14 | (2006.01) |
| G02C 5/00 | (2006.01) |
| G02C 11/00 | (2006.01) |

(52) U.S. Cl.
CPC ............. *G02C 3/003* (2013.01); *G02C 3/006* (2013.01); *G02C 5/008* (2013.01); *G02C 5/02* (2013.01); *G02C 5/146* (2013.01); *G02C 5/20* (2013.01); *G02C 5/22* (2013.01); *G02C 11/00* (2013.01); *G02C 2200/02* (2013.01)

(58) Field of Classification Search
CPC  G02C 2200/16; G02C 3/006; G02C 2200/02; G02C 3/003; G02C 5/143; G02C 2200/06
USPC ......... 351/124, 43, 118, 111, 125, 156, 157; 2/445, 448, 454, 452; 24/3.3
See application file for complete search history.

(56) References Cited

U.S. PATENT DOCUMENTS

| | | | | |
|---|---|---|---|---|
| 1,819,738 A | * | 8/1931 | Daniels | G02C 3/003 351/156 |
| 4,133,604 A | * | 1/1979 | Fuller | G02C 3/003 351/123 |
| 5,015,085 A | * | 5/1991 | May | G02C 11/02 351/156 |

(Continued)

*Primary Examiner* — Hung Dang
(74) *Attorney, Agent, or Firm* — Bay Area Technology Law Group PC

(57) ABSTRACT

Eyewear having a pair of lenses supported by frame members and a pair of releasable connectors connected to respective inner ends of the frame members, the connectors being securely connectable and releasable from each other. A strap is connected between rear ends of the eyewear temples which are in turn connected to outer ends of the frame members. Eyewear having a pair of lenses supported by frame members and a pair of releasable connectors connected to respective inner ends of the frame members, the connectors being securely connectable and releasable from each other. A strap is connected between rear ends of the eyewear temples which are in turn connected to outer ends of the frame members. The strap is rigid enough to generally retain it shape when the connectors are released and springy enough to be bendable when flexed and rebound when released, the strap being generally U-shaped having parallel legs connected to an arc-shaped base, the parallel legs being connected to rear ends of the temples when worn, the arc-shaped base extending along the back of the user's head and exhibiting a degree of buoyancy such that the eyewear floats in water.

7 Claims, 2 Drawing Sheets

(56) References Cited

U.S. PATENT DOCUMENTS

| | | | | |
|---|---|---|---|---|
| 5,151,778 A * | 9/1992 | Conley | ............... | A45C 11/04 |
| | | | | 2/452 |
| 5,575,042 A * | 11/1996 | Kalbach | ............... | G02C 3/003 |
| | | | | 24/3.13 |
| 6,253,388 B1 * | 7/2001 | Lando | ............... | A61F 9/02 |
| | | | | 2/445 |
| 6,478,419 B1 * | 11/2002 | McDaniel | ............... | G02C 3/003 |
| | | | | 351/157 |
| 7,931,366 B1 * | 4/2011 | Lando | ............... | G02C 5/20 |
| | | | | 2/445 |
| 8,025,396 B1 * | 9/2011 | Power | ............... | G02C 3/006 |
| | | | | 2/445 |
| 2004/0156011 A1 * | 8/2004 | David | ............... | G02C 3/003 |
| | | | | 351/43 |
| 2005/0280773 A1 * | 12/2005 | Bent | ............... | G02C 3/003 |
| | | | | 351/158 |
| 2014/0146282 A1 * | 5/2014 | Lu | ............... | G02C 5/20 |
| | | | | 351/118 |

* cited by examiner

FLOATABLE EYEWEAR

TECHNICAL FIELD

The present invention involves improved eyewear having a snap-together bridge feature and sufficient buoyancy inducing material such that the improved eyewear floats in water.

BACKGROUND OF THE INVENTION

Applicant is the owner of U.S. Pat. No. 6,253,388. The invention disclosed and claimed in the '388 patent involves eyewear comprised of a pair of lenses, releasable connectors connected to respective inner ends of the lenses or their frames, a pair of temples pivotable to respective outer ends of the lenses or their frames and a rigid strap attached between rear ends of the temples. The strap was taught to be positioned below the lenses so as not to interfere with a hairdo or hat of a user. The inner ends of the lenses or their frames were taught to be releasably secured together by connectors, preferably, magnets. To position the eyewear, the lenses are first separated from each other and pivoted outwardly. The strap is then wrapped around the back of the user's head and the lenses pivoted toward each other and secured together in front of the user's eyes. The lenses were taught to be instantly separable for easily putting on and taking off the eyewear, but they are instantly connectable for a secure and accurate fit.

In commercializing the eyewear of the '388 patent, the invention has generally been directed toward reading glass implementation as reading glasses are quite often applied to the bridge of the user's nose and remove repeatedly thus taking full advantage of the releasable feature described and claimed therein. However, there are other implementations of this invention facilitated by modifying it in novel and unobvious ways.

It is been determined that those involved in aquatic activities would find eyewear having a releasable feature quite advantageous. Those engaged in activities such as surfboarding and paddle boarding require sunglasses to protect their eyes from the glare reflected off of surf, sand and other natural and environmental features. Such eyewear would greatly benefit from the releasable feature of the '388 patent as users could alternatively apply the eyewear for protection when frame members are connected and allow the eyewear to drape from user's neck when not needed by pivoting the frame members as illustrated in comparing FIGS. 1 and 2, the details of which will be more thoroughly discussed below. If conventional eyewear was simply employed using a strap and fixed (non-releasable) frame members, there would be the possibility that a user could choke as the eyewear would constitute a loop around the user's neck. At the same time, due to the strenuous aquatic activities engaged in by potential users, it is envisioned that the eyewear could fall from the users neck and, a consequence, it is envisioned that a buoyancy feature would be significant.

It is thus an object to the present invention to provide eyewear which not only is characterized as having a releasable connection feature but is also buoyant such that the eyewear will float in water.

It is a further object of the present invention to provide the appropriate buoyancy material to sufficiently counteract the weight of the eyewear lenses and frame members to enable the eyewear to float and provide cushioning to enhance the comfort of the eyewear to an active user.

These and further objects will be readily apparent when considering the following disclosure and appended claims.

SUMMARY OF THE INVENTION

Eyewear, comprising:
a pair of lenses supported by frame members;
a pair of releasable connectors connected to respective inner ends of said frame members, said connectors being securely connectable together and releasable from each other;
a pair of temples connected to respective outer ends of said frame members; and
a strap connected between rear ends of said temples, said strap being rigid enough to generally retain its shape when said connectors are released, and springy enough to be bendable when flexed and rebounding when released, said strap being generally U-shaped having substantially parallel legs connected to an arc-shaped base, said substantially parallel legs being connected to rear ends of said temples when worn, said arc-shaped base extending along the back of the user's head, said strap exhibiting a degree of buoyancy such that said eyewear floats in water; and
wherein when said connectors are released, said eyewear is easy to put on and remove, and when said connectors are connected together, said lenses are secured in position relative to each other for secure and stable positioning in front of a pair of eyes.

DETAILED DESCRIPTION OF THE INVENTION

Figure 1:
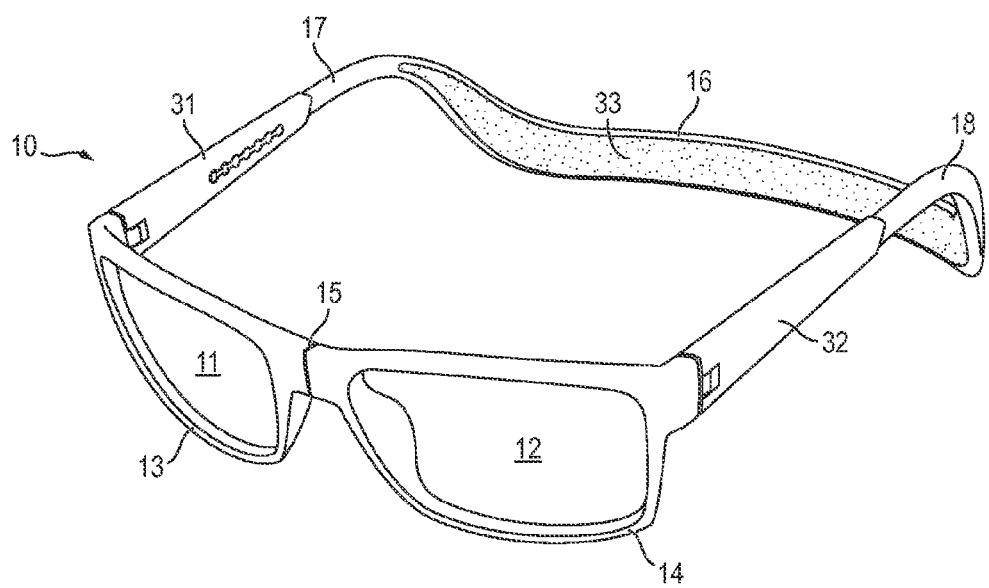
FIG. 1 is a perspective view of the eyewear of the present invention in a first orientation.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Figure 3:
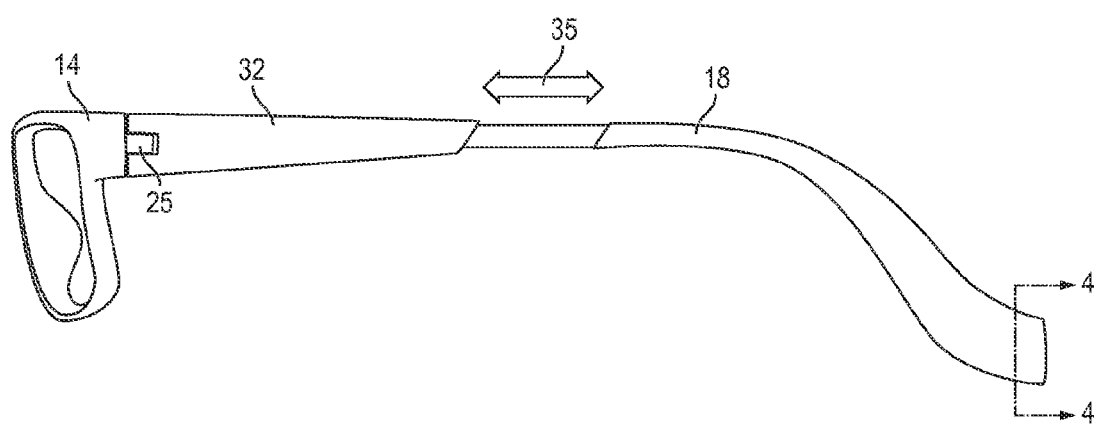
FIG. 3 is a side view of the eyewear of the present invention depicting its temple pieces.
Figure 4:
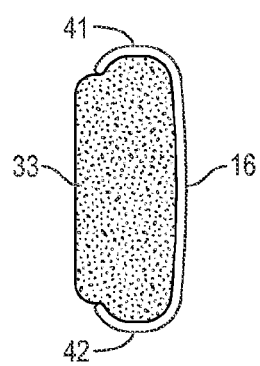
FIG. 4 is a cross-sectional view taken along line 4-4 of FIG. 3.

As noted previously, applicant has taught in its U.S. Pat. No. 6,253,388, eyewear which includes lenses 11 and 12 supported by frame members 13 and 14, respectively. Frame members 13 and 14 are detachably connected at bridge 15, preferably through the use of magnets 21 and 22. The temples of the eyewear are preferably composed of subparts 17/31 and 18/32 noting that segments 17 and 18 telescope in the directions of arrow 35 (FIG. 3) within sections 31 and 32, respectively, in order to accommodate varying users. Without this telescoping feature, an attempt to wear applicant's eyewear with the snap-together bridge feature could, and often times does, inadvertently lose connectivity resulting in the frame members 13 and 14 separating at bridge 15.

One wishing to put on eyewear 10 first opens the eyewear by moving frame members 13 and 14 about hinges 25 and 26 along arrows 23 and 24. The eyewear is then placed around the user's neck such that strap 16 sits upon the back of the user's head or nape of the user's neck whereupon the temple pieces are raised and frame members 13 and 14 drawn together such that magnets 21 and 22 cause the frame members to join at bridge 15. In doing so, the configuration depicted in FIG. 2 becomes the configuration depicted in FIG. 1. Thus, eyewear 10, as compared to traditional eyewear is significantly more convenient to apply and remove.

It is contemplated that the present eyewear is intended to be used by those engaged in physical activities and, particularly, aquatic activities. If, for example, lenses 11 and 12 are tinted such that eyewear 10 is employed as a sunglass, a user would wear such eyewear in its FIG. 1 orientation where bridge 15 sits atop the bridge of the user's nose with lenses 11 and 12 directly in front of the user's eyes while strap 16 resides behind a user's head or neck region. Thus, eyewear 10 will be resistant to loss as strap 16 will assist in preventing eyewear 10 from being disengaged regardless of the intensity of the user's physical activity. When desired, lenses 11 and 12 are removed from a user's eyes; the FIG. 1 orientation is transformed into the FIG. 2 orientation by disengaging magnets 21 and 22 and moving frame members 13 and 14 and their respective lenses 11 and 12 in the direction of arrows 23 and 24 such that eyewear 10 drapes around the user's neck and simply hangs in an unobtrusive fashion.

The present eyewear offers the significant advantage of reducing if not eliminating any danger that pre-existing eyewear would pose to an active user. Although there are a number of eyewear products that include straps located at the end of their temple pieces for retaining the eyewear around the user's neck when not in use, because the straps, temple pieces and frame pieces of conventional eyewear form a continuous loop, those involved in physical activity could conceivably be choked if such activity was to cause the eyewear to be disengaged and pulled in a direction causing it to apply pressure to a user's throat. Such a situation would be virtually impossible when employing eyewear 10.

Figure 2:
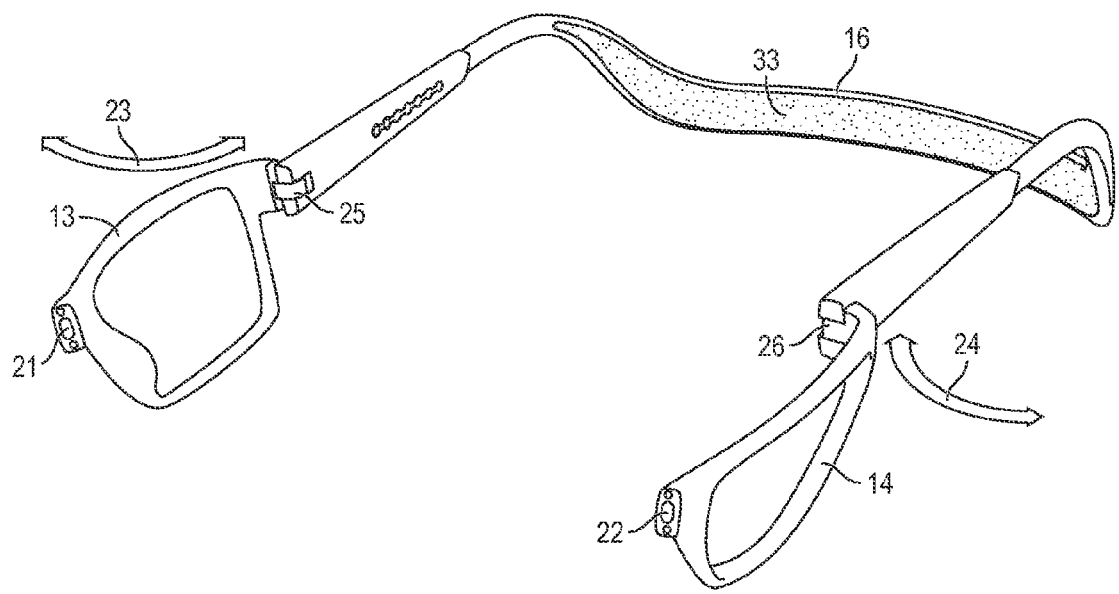
FIG. 2 is a perspective view of the eyewear of FIG. 1 in a second orientation.

As previously noted, the present eyewear is ideally suited for use in aquatic activities. As a consequence, it is a significant feature of the present invention that eyewear 10 float in water to enable the user to retrieve the eyewear in the event that significant wave action or other physical interaction with one's environment causes eyewear 10 to dislodge from his or her head or neck. In carrying out this feature, band 16, as a preferred embodiment, is configured as a thin plastic shell having inwardly turning lips 41 and 42 which gather and retain buoyancy material 33. The quantity of the buoyancy material and its composition depend, to some degree, upon the amount of buoyancy required to cause the entire eyewear structure 10 to float. It has been found, as an example, that band 16 be substantially lined with buoyancy material 33 as shown in FIG. 1 and FIG. 2 composed of, for example, neoprene. If neoprene is employed, it can be produced in its either closed-cell or open-self forms, the closed-self form being most preferred as it is waterproof by nature. Further, in applying buoyancy material 33 as shown, when in use, will rest either at the back of the user's head or at the nape of the user's neck and provide a comforting surface making eyewear 10 more pleasant to apply and use than would otherwise be the case.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. Eyewear, comprising:
   a pair of lenses supported by frame members;
   a pair of releasable connectors connected to respective inner ends of said frame members, said connectors being securely connectable together and releasable from each other;
   a pair of temples connected to respective outer ends of said frame members; and
   a strap connected between rear ends of said temples, said strap being rigid enough to generally retain its shape when said connectors are released, and springy enough to be bendable when flexed and rebounding when released, said strap being generally U-shaped having substantially parallel legs connected to an arc-shaped base, said substantially parallel legs being connected to rear ends of said temples when worn, said arc-shaped base extending along the back of the user's head, said strap exhibiting a degree of buoyancy such that said eyewear floats in water; and
   wherein when said connectors are released, said eyewear is easy to put on and remove, and when said connectors are connected together, said lenses are secured in position relative to each other for secure and stable positioning in front of user's eyes.

2. The eyewear of claim 1 wherein said connectors are comprised of magnets.

3. The eyewear of claim 1 wherein said temples are comprised of telescopic subparts for fitting different wearers.

4. The eyewear of claim 1 wherein said temples are pivotally connected to said frame members so that when said connectors are released from each other, said inner ends of said frame members are pivotable outwardly for making said eyewear easier to put on and remove.

5. The eyewear of claim 1 wherein said arc-shaped base portion of said strap comprises a channel and a buoyancy inducing material, said buoyancy inducing material being configured to be captured by said channel.

6. The eyewear of claim 5 wherein said buoyancy inducing material comprises neoprene.

7. The eyewear of claim 5 wherein said buoyancy inducing material is configured onto said strap such that said eyewear is being worn, it contacts the back of the user's head or neck.

\* \* \* \* \*